US 6,760,493 B2

(12) United States Patent
Pruneri et al.

(10) Patent No.: US 6,760,493 B2
(45) Date of Patent: Jul. 6, 2004

(54) COPLANAR INTEGRATED OPTICAL WAVEGUIDE ELECTRO-OPTICAL MODULATOR

(75) Inventors: Valerio Pruneri, Grosio (IT); Antonino Nespola, Moncalieri (IT)

(73) Assignee: Avanex Corporation, Fremont, CA (US)

( * ) Notice: Subject to any disclaimer, the term of this patent is extended or adjusted under 35 U.S.C. 154(b) by 175 days.

(21) Appl. No.: 10/185,772

(22) Filed: Jun. 28, 2002

(65) Prior Publication Data

US 2003/0002766 A1 Jan. 2, 2003

Related U.S. Application Data

(60) Provisional application No. 60/303,160, filed on Jul. 6, 2001.

(30) Foreign Application Priority Data

Jun. 28, 2001 (EP) .............................................. 01115845

(51) Int. Cl.[7] .............................. H01S 3/00; G02B 6/00; G02B 6/26
(52) U.S. Cl. ....................... 385/8; 385/4; 385/2; 385/3; 385/9; 359/315; 359/316; 359/319; 359/320; 359/322; 350/96.13; 350/96.14
(58) Field of Search ............................. 385/2, 3, 4, 8, 385/9; 359/315, 316, 319, 320, 322; 350/96.13, 96.14

(56) References Cited

U.S. PATENT DOCUMENTS

| 4,070,094 | A | * | 1/1978 | Martin ........................... 385/8 |
| 4,127,320 | A | * | 11/1978 | Li ................................... 385/9 |
| 4,157,860 | A | * | 6/1979 | Marcatili ....................... 385/9 |
| 4,223,997 | A | * | 9/1980 | Violet et al. .................. 366/47 |
| 4,262,993 | A | * | 4/1981 | Burns et al. ................... 385/8 |

(List continued on next page.)

FOREIGN PATENT DOCUMENTS

| JP | 07191352 | 7/1995 |
| JP | 11231358 | 8/1999 |

OTHER PUBLICATIONS

Lisheng Huang and Nicolos A. F. Jaeger, "Discussion of domain inversion in LiNbO3," Appl. Phys. Lett. 65 (14), Oct. 3, 1994, pp. 1763–1765.

P. W. Haycock and P. D. Townsend, "A method of poling LiNbO3 and LiTaO3 below Tc," Appl. Phys. Lett. 48 (11), Mar. 17, 1986, pp. 698–700.

M. Yamada, N. Nada, M. Saitoh, and K. Watanabe, "First–order quasi–phase matched LiNbO3 waveguide periodically poled by applying an external field for efficient blue second–harmonic generation," Appl. Phys. Lett. 62 (5), Feb. 1, 1993, pp. 435–436.

(List continued on next page.)

Primary Examiner—John R. Lee
Assistant Examiner—David A. Vanore
(74) Attorney, Agent, or Firm—Moser, Patterson & Sheridan, L.L.P.

(57) ABSTRACT

A coplanar integrated optical waveguide electro-optical modulator comprises a substrate (1) of an electro-optic material, at least two optical waveguides (41, 42) integrated in the substrate in correspondence of a surface (71) thereof, and an electrode system (80, 90, 100; 80, 90, 900; 12-15; 120, 130, 140, 150, 160, 170) arranged on the surface for applying a modulating electric field to the waveguides suitable for causing a modulation of a refractive index of the two waveguides in a device modulation region (50). The waveguides are formed, for at least a section thereof (411, 421) in the device modulation region, in respective substrate regions (61, 62) which have electro-optic coefficients of opposite sign along an axis transversal to the waveguide sections, so that a modulating electric field of same direction and orientation in the waveguide sections causes refractive index modulations of opposite sign in the waveguide sections. Chirp-free coplanar waveguide modulators and single-drive double coplanar strip modulators can thus be obtained.

14 Claims, 7 Drawing Sheets

U.S. PATENT DOCUMENTS

| | | | | |
|---|---|---|---|---|
| 4,266,850 A | * | 5/1981 | Burns | 385/8 |
| 4,340,272 A | * | 7/1982 | Papuchon et al. | 385/8 |
| 4,436,365 A | * | 3/1984 | Hodgins et al. | 385/8 |
| 4,840,447 A | * | 6/1989 | Kataoka | 385/5 |
| 4,843,350 A | * | 6/1989 | Nazarathy et al. | 385/3 |
| 4,871,223 A | * | 10/1989 | Auracher et al. | 385/2 |
| 5,008,957 A | * | 4/1991 | Kiyono | 398/186 |
| 5,022,731 A | * | 6/1991 | Maerfeld et al. | 359/332 |
| 5,040,865 A | * | 8/1991 | Chen et al. | 385/2 |
| 5,069,517 A | * | 12/1991 | Kersten et al. | 385/130 |
| 5,199,086 A | * | 3/1993 | Johnson et al. | 385/2 |
| 5,278,924 A | * | 1/1994 | Schaffner | 385/3 |
| 5,323,406 A | | 6/1994 | Yee et al. | 372/26 |
| 5,359,680 A | | 10/1994 | Riviere | 385/9 |
| 5,388,170 A | | 2/1995 | Heismann et al. | 385/4 |
| 5,404,412 A | | 4/1995 | Seino et al. | 385/2 |
| 5,408,544 A | | 4/1995 | Seino | 385/3 |
| 5,515,463 A | | 5/1996 | Hahn | |
| 5,544,268 A | | 8/1996 | Bischel et al. | 385/4 |
| 5,566,263 A | | 10/1996 | Smith et al. | 385/40 |
| 5,647,036 A | | 7/1997 | Deacon et al. | 385/27 |
| 5,664,032 A | | 9/1997 | Bischel et al. | 385/4 |
| 5,692,075 A | | 11/1997 | Hwang et al. | 385/3 |
| 5,712,933 A | | 1/1998 | Nishimoto et al. | 385/9 |
| 5,798,856 A | | 8/1998 | Suzuki et al. | 398/183 |
| 5,875,048 A | | 2/1999 | Nemecek et al. | 398/194 |
| 5,930,412 A | * | 7/1999 | Toussaere | 385/3 |
| 6,091,864 A | * | 7/2000 | Hofmeister | 385/2 |
| 6,101,296 A | * | 8/2000 | Tavlykaev et al. | 385/2 |
| 6,204,951 B1 | * | 3/2001 | Coward et al. | 359/245 |
| 6,222,965 B1 | * | 4/2001 | Smith | 385/40 |
| 6,289,156 B1 | * | 9/2001 | Pan et al. | 385/39 |
| 6,304,685 B1 | * | 10/2001 | Burns | 385/3 |
| 6,334,005 B1 | * | 12/2001 | Burie et al. | 385/3 |
| 6,393,172 B1 | * | 5/2002 | Brinkman et al. | 385/16 |
| 6,473,547 B2 | * | 10/2002 | Longone | 385/40 |
| 6,522,793 B1 | * | 2/2003 | Szilagyi et al. | 385/2 |
| 6,628,849 B2 | * | 9/2003 | Yap et al. | 385/3 |
| 6,646,776 B1 | * | 11/2003 | Cheung et al. | 359/254 |
| 2003/0031400 A1 | * | 2/2003 | Pruneri | 385/14 |

OTHER PUBLICATIONS

M. Fujimura, T. Suhara and H. Nishihara, "FerroelectricDomain Inversion Induced By SiO2 Cladding for LiNbO3 Waveguide SHG," Electronics Letters 20$^{th}$ Jun. 1991 vol. 27 No. 13, pp. 1207–1209.

Shintaro Miyazawa, "Ferroelectric domain inversion in Ti–diffused LiNbO3 optical waveguide," J. Appl. Phys. 50 (70), Jul. 1979, pp. 4599–4603.

Kiyoshi Nakamura and Hiroshi Shimizu, "Ferroelectric inversion layers formed by heat treatment of proton–exchanged LiTaO3," Appl. Phys., Lett. 56 (16), Apr. 16, 1990, pp. 1535–1536.

Norio Ohnishi, "An Etching Study on a Heat–Induced Layer at the Positive–Domain Surface of LiNbO3," Japan J. App. Phys., vol. 16 (1977), No. 6, pp. 1069–1070.

Kazuto Noguchi, Osamu Mitomi and Hiroshi Miyazawa, "Millimeter–Wave TiLiNBO3 Optical Modulators," Journal of Lightwave Technology, vol. 16, No. 4, Apr. 1998, pp. 615–619.

Wenshen Wang, Yongqiang Shi, David J. Olson, Weiping Lin, and James H. Bechtel, "Push–Pull Poled Polmer Mach–Zehnder Modulators with a single Microstrip Line Electrode," IEEE Photonics Technology Letters, vol. 11, No. 1, Jan. 1999, pp. 51–53.

Kazuto Noguchi, Hiroshi Miyazawa and Osamu Mitomi, "40–Gbit/s Ti:LiNbO3 Optical Modulator with a Two–Stage Electrode,".

Tetsuya Kishino, Robert F. Tavlykaev, and Ramu V. Ramaswamy, 70+ um deep domain inversion in X–cut LiNbO3 and its use in a high–speed bandpass integrated–optic modulator, Applied Physics Letters, vol. 76, No. 26, Jun. 26, 2000, pp. 3852–3854.

* cited by examiner

COPLANAR INTEGRATED OPTICAL WAVEGUIDE ELECTRO-OPTICAL MODULATOR

CROSS-REFERENCE TO RELATED APPLICATIONS

This application claims the benefit of priority under 35 U.S.C. §119 of European Patent Application Serial No. EP01115845.8, filed on Jun. 28, 2001.

This application claims the benefit of priority under 35 U.S.C. §119 (e) of U.S. Provisional Application Serial No. 60/303,160 filed on Jul. 6, 2001.

BACKGROUND OF THE INVENTION

1. Field of the Invention

The present invention relates generally to the field of integrated optics. More specifically, the invention relates to integrated optical waveguide electro-optical modulators, that is devices based on the electro-optic effect in which optical beams propagate through optical waveguides integrated in an electro-optic substrate material, particularly optical intensity, i.e. amplitude, interferometric modulators of the Mach-Zehnder type. Still more particularly, the invention relates to a coplanar integrated optical waveguide electro-optical modulator, in which the electrodes necessary for applying a modulating electric field are arranged on a same substrate surface.

2. Technical Background

Integrated electro-optical devices, such as modulators and switches, are fabricated on substrates of electro-optic material. Among all the known substrate materials, lithium niobate ($LiNbO_3$) is probably the most widely used because of the enhanced electro-optic properties thereof and the possibility of making low loss optical waveguides. Another known substrate material is for example lithium tantalate ($LiTaO_3$).

Electro-optic materials show an electro-optic response, a second-order non-linear property which is characterized by a tensor. This tensor relates the polarization changes at optical frequencies (i.e., refractive index changes) of the material to low-frequency modulating electric fields, that is modulating electric fields at frequencies much lower than those of the optical fields. Phase and amplitude modulation of optical fields can be obtained by applying external electric fields, which modify the material refractive index via the electro-optic effect.

Overlooking, for simplicity, the tensorial nature of the electro-optic effect, the refractive index change $\Delta n(\omega)$ at the optical frequency $\omega$ is proportional to the product of an electro-optic coefficient r and the modulating electric field Eo: $\Delta n(\omega) \propto r \cdot Eo$.

In the case of a $LiNbO_3$ crystal the electro-optic coefficient having the highest value is $r_{33} \approx 30$ pm/V. The electro-optic coefficient $r_{33}$ relates the refractive index change experienced by electromagnetic waves polarised along the c (also called z) crystal axis to the component of the modulating electric field along the same axis.

For this reason $LiNbO_3$ crystal substrates are generally made available in z-cut slices, with the z crystal axis normal to the substrate surfaces of largest area, since this configuration is the one ensuring superior modulation performances even at relatively high modulation frequencies.

A Mach-Zehnder interferometric electro-optical modulator is a device capable of providing an electrically-induced amplitude modulation of an optical signal. In a Mach-Zehnder interferometric electro-optical modulator the voltage required to drive the modulator is reduced when the two optical modes propagating along the two interferometer arms experience changes of the refractive index having opposite sign. This is achieved by properly designing the electrode geometry, so that the component of the modulating electric field along the z axis has opposite signs (i.e. opposite orientations with respect to the z axis orientation) in the two interferometer arms. The resulting device is said to have a push-pull configuration.

FIGS. 1 to 4 show typical examples of push-pull Mach-Zehnder interferometric electro-optical modulators. Specifically, FIGS. 1 and 2 schematically show, respectively in top-plan and in cross-sectional views, a so-called coplanar waveguide ("CPW") configuration. FIGS. 3 and 4 schematically show, again in top plan and in cross-section, a so-called double coplanar strip ("CPS") configuration.

The electro-optic performances of devices based on the above cited configurations are extensively described in literature. For example, the performances of the CPW configuration is discussed in K. Noguchi et al., '40-Gbit/s Ti:LiNbO3 optical modulator with a two-stage electrode', IEICE Trans. Electron., vol. E81-C, p. 316 (1998) and in K. Noguchi et al., 'Millimiter-wave Ti:LiNbO3 optical modulators', J. of Lightwave Tech., vol.16, p.615 (1998). The double CPS configuration is for instance described in U.S. Pat. No. 5,388,170.

Referring to FIGS. 1 and 2, in a z-cut $LiNbO_3$ substrate 1 a Mach-Zehnder interferometer is integrated comprising an input optical waveguide 2 or input channel, a first Y-junction 3 for splitting an input optical signal propagating along the input waveguide 2 into two optical signals propagating along two generally parallel optical waveguides 41, 42 forming the interferometer arms, a second Y-junction 5, spaced apart from the first Y-junction, for combining the two optical signals into an output optical signal propagating along an output optical waveguide 6 or output channel. The waveguides 2, 41, 42 and 6 are formed by conventional techniques in correspondence of a surface 7 of the substrate 1 perpendicular to the z crystal axis. The substrate forms a single ferroelectric domain so that throughout the substrate the z crystal axis keeps a same orientation, for example the orientation shown by the arrow in FIG. 2.

In the region of the interferometer arms, a first metal electrode 8 is superimposed over the surface 7 above the waveguide 42 and extends for a section 421 thereof, a second metal electrode 9 is superimposed over the surface 7 above the waveguide 41 and extends for a section 411 thereof substantially corresponding to the section 421 of the waveguide 42, and a third metal electrode 10 is superimposed over the surface 7 and extends, laterally to the second electrode 9 and on the opposite side of the first electrode 8, for a segment substantially corresponding to the section 411 of waveguide 41. Conventionally, a buffer layer 11, typically of silicon dioxide ($SiO_2$), is formed over the surface 7 for separating the metal electrodes 8, 9 and 10 from the optical fields in the waveguides 41, 42 so to avoid attenuation of said optical fields.

The electrodes 8, 9 and 10 are used for applying a modulating electric field useful for varying, by electro-optic effect, the refractive index in the two waveguides 41, 42. The electrodes 8 and 10 are electrically connected to a reference potential (ground), and are therefore called ground electrodes. The electrode 9 is electrically connected to a modulating potential V, and is called hot electrode. The shape and layout of the electrodes are properly designed so as to allow the operation of the device up to the microwave region of the spectrum of the modulating electric field. By applying a modulating electric field, the refractive index of the two waveguides 41, 42 undergoes opposite variations and the optical signals propagating along such waveguides correspondingly undergo opposite phase shifts (push-pull effect). An amplitude modulated output optical signal is thus obtained in waveguide 6, the amplitude depending on the overall phase shift.

The main disadvantage of the CPW configuration is the asymmetry of the structure, which gives rise to an asymmetry in the interaction between each optical mode propagating along the interferometer arms and the modulating electric field. Such an asymmetry causes different phase shifts in the two interferometer arms, thus inducing chirps in the phase of the amplitude modulated output optical field. This asymmetry is inherent to the device, since in order to have opposite phase shifts in the two interferometer arms the two waveguides must be placed one under the hot electrode and the other under the ground electrode. The efficiency of the phase shift induced on the optical mode propagating through a waveguide by the modulating electric field depends on the overlap between the modulating electric field and the optical mode, and is expressed by an overlap factor $\Gamma$. The ratio of the overlap factors $\Gamma h$ in the waveguide 41 under the hot electrode 9 and $\Gamma g$ in the waveguide 42 under the ground electrode 8 is significantly high, reaching typical values of 6, so significantly different phase shifts take place in the two waveguides.

In the double CPS configuration of FIGS. 3 and 4, two hot electrodes 13 and 15 are provided, respectively superimposed over and extending for corresponding sections 421 and 411 of the waveguides 42 and 41. Two ground electrodes 12 and 14 are also provided, respectively adjacent a respective one of the hot electrodes 13 and 15. The two hot electrodes 13, 15 are electrically connected to modulating potentials +V, −V of opposite sign with respect to the ground potential. For this reason, this configuration is also called dual-drive.

In some cases, a third ground electrode, shown in dash and dot in the drawings and identified by 16, can be provided in between the hot electrodes 13 and 15, so that each of the latter extends between two ground electrodes. The resulting structure, ensuring a still higher symmetry, is said to have a double CPW configuration.

The double CPS configuration, as well as the double CPW one, does not suffer of the problem previously discussed in connection with the CPW configuration and is therefore referred to as chirp-free. However, the need for a dual drive significantly increases the complexity of the electronic circuits generating the driving potentials of opposite sign. This is a great disadvantage of the double CPS configuration.

JP 07-191352 discusses the problems of an optical waveguide device, such as a directional coupling optical switch, in which mutual exchange of wave energy between the waveguides takes place. This device, which is clearly different from an electro-optical modulator since in the latter no exchange of wave energy takes place between the waveguides, comprises a crystal substrate formed from a z-cut $LiNbO_3$ crystal, in which two optical waveguides are formed adjacent and parallel to each other in the substrate surface. The device has a coupling region, that is the region of the substrate wherein the mutual exchange of wave energy between the waveguides takes place. Positive and negative electrodes are formed on the same substrate surface as the optical waveguides, with interposition of a buffer layer, and extend parallelly to each other in partial overlap with a respective waveguide. An electric field which curves toward the negative electrode from the positive electrode is generated, which has an action in approximately reverse directions, with respect to the z crystal axis, in the two waveguides.

According to JP 07-191352, in this configuration the direction of action of the electric field in the two optical waveguides is only approximately reverse, so there is a large loss of electric field action compared to a case of perfectly reverse directions. In addition, in order to ensure the most effective action of the electric field on both optical waveguides, fine position adjustment is necessary, by way of example edge sections of the electrodes are matched to the optimum position in the central region of the optical waveguide device so that the dense section of the electric field is concentrated on the optical waveguides. High-precision position adjustment of this kind on the minute optical waveguides is extremely difficult and hinders productivity improvements. Furthermore, because the positive and negative electrodes are formed in alignment on the same surface of the crystal substrate, a phenomenon (DC drift) is generated in which the operation voltage fluctuates due to the presence of the buffer layer between both electrodes, and this presents a significant problem in terms of actual application.

In that document the coplanar electrode arrangement is therefore excluded and a device is described which allegedly solves these problems. In the described device a pair of optical waveguides, formed on the surface of a z-cut lithium niobate crystal substrate, perform a mutual exchange of wave energy in a coupling area of the substrate. The z axis directions of the crystal, from which the optical waveguides are formed, are formed in mutually reverse directions, and opposing and parallel flat-plate positive and negative electrodes are arranged in the upper and lower surfaces of the crystal substrate. Based on this configuration, by the action of a linear, uniform and parallel electric field formed between the opposing flat-plate electrodes, an action in the respective reverse directions with respect to the z axis of the optical waveguides is effected.

The solution proposed by JP 07-191352 is based on the known property of ferroelectric materials that the signs of the non-linear optical coefficient (identified as d) and electro-optic coefficient (r) are related to the orientation of the ferroelectric domain, i.e. to the orientation of the spontaneous polarization of the crystal. When the orientation of the crystal spontaneous polarization is inverted both d and r change sign, being the manifestation of the second-order non-linear material response to, respectively high and low frequency, electromagnetic fields.

This phenomenon has been exploited in laser-diode-based second-harmonic generation (SHG) devices to achieve highly efficient quasi-phase-matched frequency conversion, as reported in M. Yamada et al., 'First-order quasi-phase-matched $LiNbO_3$ waveguide periodically poled by applying an external field for efficient blue second-harmonic generation', Appl. Phys. Lett., vol. 62, p. 435 (1993).

In connection with electro-optical modulators, the effects of ferroelectric domain inversion have been exploited in U.S. Pat. No. 5,278,924 for obtaining an opto-electric modulator which compensates for phase velocity mismatches between optical modulation and an RF electric signal.

Both in SHG devices and in the device disclosed in U.S. Pat. No. 5,278,924 a suitable periodically inverted ferroelectric domain structure is requested and the optical modes propagate through many ferroelectric domain boundaries. The linear loss due to scattering and reflection at these boundaries is often below the detection level, in any case negligible when compared to any waveguide loss. In fact it is well known that differently oriented domains have the same linear dielectric properties (the refractive index is the same in differently oriented domains).

For example, in U.S. Pat. No. 5,278,924 an integrated optic Mach-Zehnder interferometer with an asymmetric coplanar waveguide travelling wave electrode is formed in a substrate which has a ferroelectric domain that has inverted regions and non-inverted regions. The inverted and non-inverted regions extend parallel to each other transversally to the interferometer arms in alternated succession along the arms. The optical signal in each interferometer arm passes through the inverted and non-inverted regions of the ferroelectric domain. Each transition between inverted and non-inverted regions changes the sign of the induced phase modulation of the optical signal. This compensates for 180° phase difference between the modulation on the optical signal and the RF electric signal caused by the phase velocity mismatch between the RF and optical signals.

In still another context, in U.S. Pat. No. 5,267,336 the effects of ferroelectric domain inversion have been exploited to obtain an electric field sensor useful in detecting and measuring wideband transient electrical responses by means of an integrated optical waveguide Mach-Zehnder interferometer without any electrodes. This document addresses the drawbacks of conventional electro-optical sensors, in which an external electric field to be measured is picked up by an antenna and converted to a voltage which is then applied to appropriate electrodes positioned on or near the interferometer arms in such a way as to create electric fields in opposite directions in each of the two interferometer arms. According to this document, in a variety of applications that require the measurement of electric fields the presence of a metal electrode tends to disturb the electric field under measurement. In severe cases the close proximity of the electrodes could create arcing, thus creating a short circuit. The metal electrode also tends to limit the frequency response of the sensor due to the capacitive nature of the electrical circuit. This electrical circuit could also pose hazard in the presence of combustible or explosive materials. Therefore, according to this document, there is the desire to have electric field sensors that do not require any metal electrodes. According to this document, this is achieved by reversing the ferroelectric domains of one of the two interferometer arms, so that an external vertically directed electric field produce equal and opposite phase shifts in the two interferometer arms, leading to a total phase shift as experienced by the conventional electrode device.

SUMMARY OF THE INVENTION

The Applicant has observed that coplanar electrode arrangements are advantageous over non-coplanar counterparts, especially in high-frequency applications.

The Applicant has also found that exploiting the effect of sign reversal of the electro-optic coefficient to realise coplanar integrated electro-optical Mach-Zehnder type modulators in an electro-optic material substrate, for example by means of ferroelectric domain inversion in ferroelectric materials such as $LiNbO_3$, so that at least in a modulating region of the device the sign of the electro-optic coefficient is different in one interferometer arm with respect to the other, new and advantageous modulator structures can be devised with respect to single domain electro-optic substrates. Such structures include for example a chirp-free coplanar waveguide modulator (where only one hot electrode is used) and a single-drive double coplanar strip modulator (where two hot electrodes are used).

According to one aspect of the invention, a coplanar integrated optical waveguide electro-optical modulator is provided, comprising:

a substrate of an electro-optic material;

at least two optical waveguides integrated in the substrate in correspondence of a surface thereof and defining a device modulation region therebetween, such waveguides disposed with respect to each other so as to substantially prevent the exchange of optical energy between said waveguides within the device modulation region, and an electrode system arranged on said surface for applying a modulating electric field to the waveguides suitable for causing a modulation of a refractive index of the two waveguides in a device modulation region, characterized in that the waveguides are formed, for at least a section thereof in the device modulation region, in respective substrate regions each of which includes at least two successive segments having electro-optic coefficients with alternated sign, each successive segment being passed through by a respective one of the at least two waveguides, pairs of regions in the successive segments, substantially aligned in the direction transversal to the waveguides, having electro-optic coefficients of mutually opposite sign, so that a modulating electric field of same direction and orientation in the waveguide sections causes refractive index modulations of opposite sign in the waveguide sections.

In one embodiment, the waveguide sections and the respective substrate regions having electro-optic coefficients of opposite sign extend substantially for the whole device modulation region.

The electrode system may comprise at least two ground electrodes each one extending over said section of a respective waveguide, and at least a hot electrode extending between the ground electrodes. The electrodes thus form a coplanar waveguide electrode system.

Alternatively, the electrode system may comprise one hot electrode extending over said sections of the waveguides, and at least one ground electrode extending at the side of the hot electrode. Also in this case, the electrodes form a coplanar waveguide electrode system, but a drive voltage to be applied to the hot electrode can be reduced.

In this case, since the waveguides shall be spaced apart of a distance suitable to substantially prevent optical coupling therebetween in the modulation region, the hot electrode preferably comprises a wider portion having a width equal to or higher than said distance, and a narrower portion on the top of the wider portion.

In another embodiment, the electrode system comprises two hot electrodes, each one extending over said section of a respective waveguide, for receiving a same modulating voltage, and at least one ground electrode extending aside the hot electrodes, so as to form a double coplanar strip electrode system.

Preferably, the at least one ground electrode comprises two ground electrodes, each one extending aside a respective hot electrode on an side thereof opposite to the other hot electrode.

In a preferred embodiment, the coplanar integrated optical waveguide electro-optical modulator has an electrode system comprising an integrated power splitter for receiving an externally-generated modulating voltage and supplying it to the two hot electrodes.

Outside the modulation region the waveguides are optically connected by means of respective Y-junctions to an input waveguide and an output waveguide. The two hot electrodes may merge together at said Y-junctions and have extensions over the input and output waveguides.

Preferably, the ground electrodes extend aside said extensions so as to form, in correspondence of the input and output waveguides, coplanar waveguide electrode systems.

In case the substrate of electro-optic material is a z-cut substrate of ferroelectric material, that is a material having a spontaneous polarization, such as for example lithium niobate, the regions having electro-optic coefficients of opposite sign are regions having mutually oppositely oriented ferroelectric domains.

The substrate material may also be an x-cut substrate of ferroelectric material, particularly lithium niobate. In this case, the provision of opposite oriented ferroelectric domains allows to form a push-pull modulator by placing one hot electrode and one ground electrode.

According to a second aspect of the invention, an electro-optical modulator is provided comprising the coplanar integrated optical waveguide electro-optical modulator according to the first aspect of the invention, and an electrical drive element adapted for supplying to the electrode system a unipolar drive potential.

According to still another aspect of the invention, a transmission station for an optical communication system is provided, comprising at least an optical beam generation means for generating an optical beam and an electro-optical modulator according to the second aspect of the invention.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
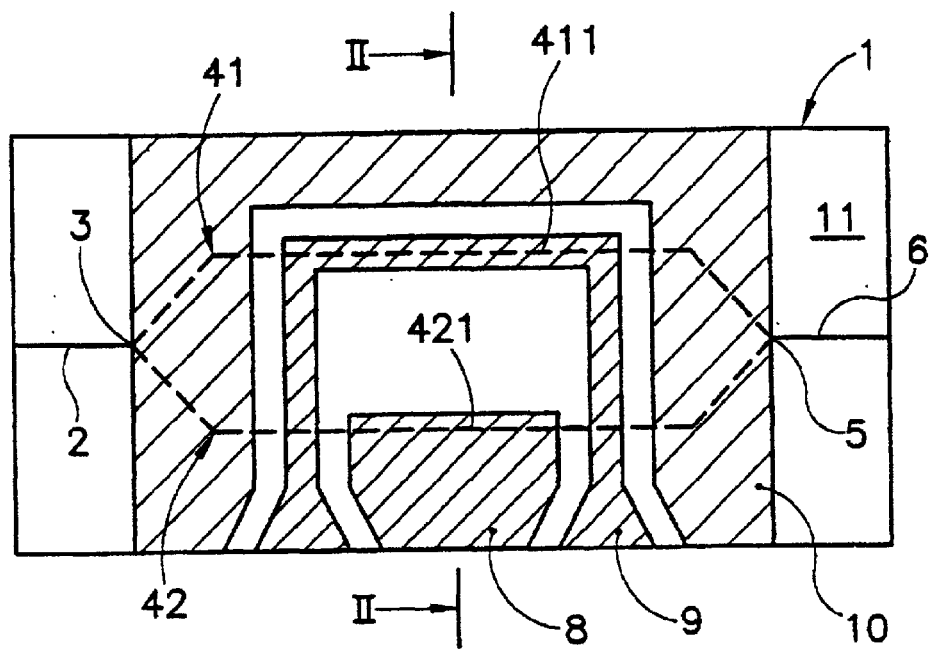
FIG. 1 is a schematic top-plan view of a conventional coplanar waveguide integrated electro-optic modulator.

In the drawings, the reference numerals already adopted to identify parts of the prior-art structures of FIGS. 1 to 4 are also used in FIGS. 5 to 12 to identify similar or corresponding parts.

Figure 5:
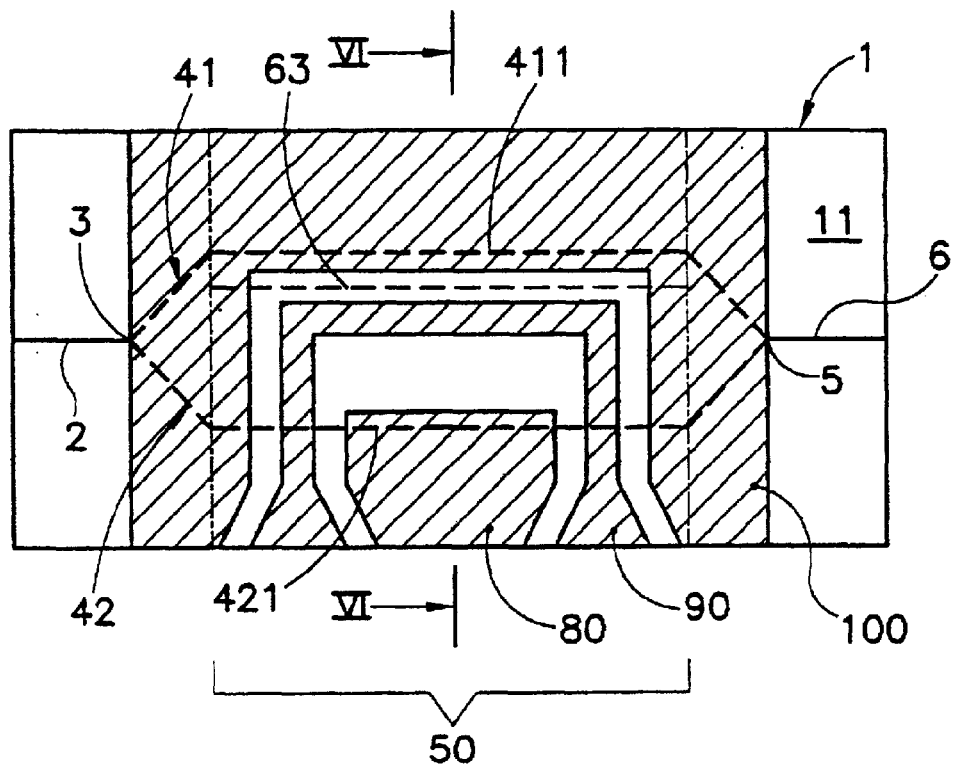
FIG. 5 is a schematic top-plan view of a chirp-free coplanar waveguide integrated electro-optic modulator according to one embodiment of the invention.
Figure 6:
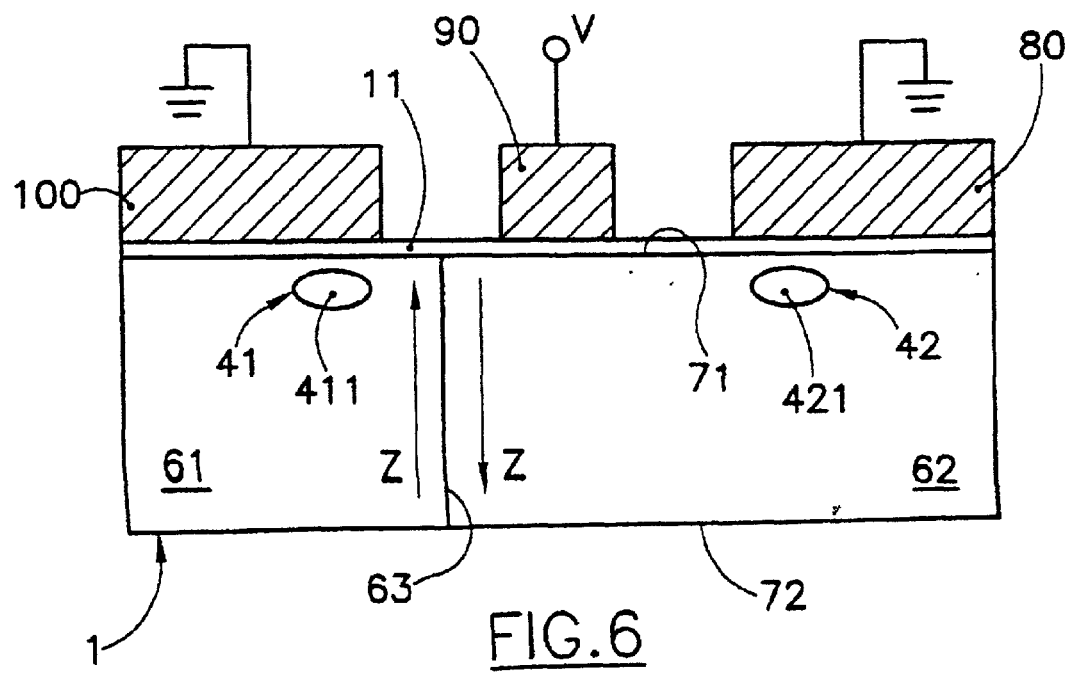
FIG. 6 is a cross-section of the modulator of FIG. 5 taken along line VI—VI.

In FIGS. 5 and 6 a first embodiment of the invention is shown, specifically a coplanar waveguide (CPW) Mach-Zehnder integrated electro-optical modulator. The substrate 1 is of z-cut electro-optic material, for example an inorganic crystal such as $LiNbO_3$, $LiTaO_3$, KTP or a non-centrosymmetric polymer which can be poled, a poled glass, a semiconductor.

The substrate 1 includes, at least in a device modulation region 50 intended for the interaction between optical fields and electric fields, at least two regions 61, 62 having electro-optical coefficients of opposite sign, for example, in the case the substrate is a ferroelectric material having a spontaneous polarization, two ferroelectric domain regions 61, 62 with mutually inverted ferroelectric domains, that is mutually inversely poled. In other words, in one region, e.g. region 61, the ferroelectric domain, and thus the z crystal axis, has an orientation opposite to the orientation of the ferroelectric domain, and thus of the z crystal axis, in the other region 62. In the drawing this is schematically shown by means of a different, opposite orientation of the z crystal axis in the two regions: towards the top surface 71 of the substrate in region 61, towards the bottom surface 72 of the substrate in region 62. For example, the ferroelectric domain of region 62 has the same orientation as the ferroelectric domain of the remaining of the substrate 1, and the ferroelectric domain of region 61 is inverted with respect to the ferroelectric domain of the remaining of the substrate 1.

In each ferroelectric domain region 61, 62 a respective one of the two optical waveguides 41, 42 is formed, and the ferroelectric domain regions extend in the modulation region 50 longitudinally to the waveguides 41, 42. A boundary 63 between the two ferroelectric domain regions 61, 62 is located in an intermediate position between the two waveguides 41, 42.

In the modulation region 50 metal electrodes 80, 90 and 100, preferably made of gold, are superimposed over the top surface 71 of the substrate 1 with interposition of the buffer layer 11. The buffer layer 11 can be, for example, a layer of silicon dioxide or, preferably, a layer of benzo-cyclobuthene (BCB) which has a slightly lower dielectric constant than silicon dioxide and consequently ensures a better phase matching between the optical modes and the modulating electric field, and lower losses especially in the case of a modulating electric field in the microwave spectrum range.

In particular, a first electrode 80 is superimposed over the waveguide 42 and extends for a section 421 thereof, a second metal electrode 100 is superimposed over the waveguide 41 and extends for a section 411 thereof substantially corresponding to the section 421 of waveguide 42, and a third metal electrode 90 is superimposed over a portion of the ferroelectric domain region 62 in between the two waveguides 41, 42.

The electrodes 80 and 100 are intended to be electrically connected to a reference potential (ground), and act therefore as ground electrodes. The electrode 90 is intended to be electrically connected to a modulating potential V, and therefore acts as a hot electrode. The layout of the electrodes is properly designed so as to allow the operation of the device up to the microwave region of the spectrum of modulating electric field.

Each ferroelectric domain region has to be sufficiently large (in the direction transversal to the waveguides) to include the waveguide of one of the two interferometric modulator arms. Preferably the ferroelectric domain regions cover the whole transverse profile of the optical mode propagating through the respective waveguide. As far as the thickness of the ferroelectric domain regions is concerned, the deeper the inverted region from the waveguide surface, the greater the overlap of the change of refractive index with the optical mode, i.e. the effective refractive index change seen by the optical mode.

In order to modulate the optical signal entering the modulator, the electrodes 80, 90 and 100 are electrically connected to a time-variable voltage source, so that a modulating electric field is applied to the electrodes 80, 90 and 100.

Albeit the direction and orientation of the modulating electric field is the same in the two waveguides 41, 42, the fact that the latter are formed in regions having mutually inverted ferroelectric domain orientations along the z axis causes the refractive index of the two waveguides 41, 42 to undergo opposite changes and the optical signals propagating along such waveguides correspondingly undergo opposite phase shifts. Thus the device has a push-pull configuration.

In fact, the domain inversion alters the non-linear properties of the substrate material, leaving unchanged the linear dielectric properties. In other words, the dielectric constants at all frequencies, including the microwave and optical regimes, when no external field is applied, are the same in differently oriented ferroelectric domains. If the geometry is such that an external modulating field is present across the boundary between the mutually inverted ferroelectric domain regions, an opposite-sign refractive index change is established in the two mutually inverted ferroelectric domain regions, but still this change is not high enough to cause any significant loss by reflection and/or scattering in a waveguide extending across the boundary.

Since in the devices described in this application there may be two domain boundaries only that the mode has to cross while propagating along one of the arms of the Mach-Zehnder, reflection and/or scattering losses are a fortiori low.

Figure 2:
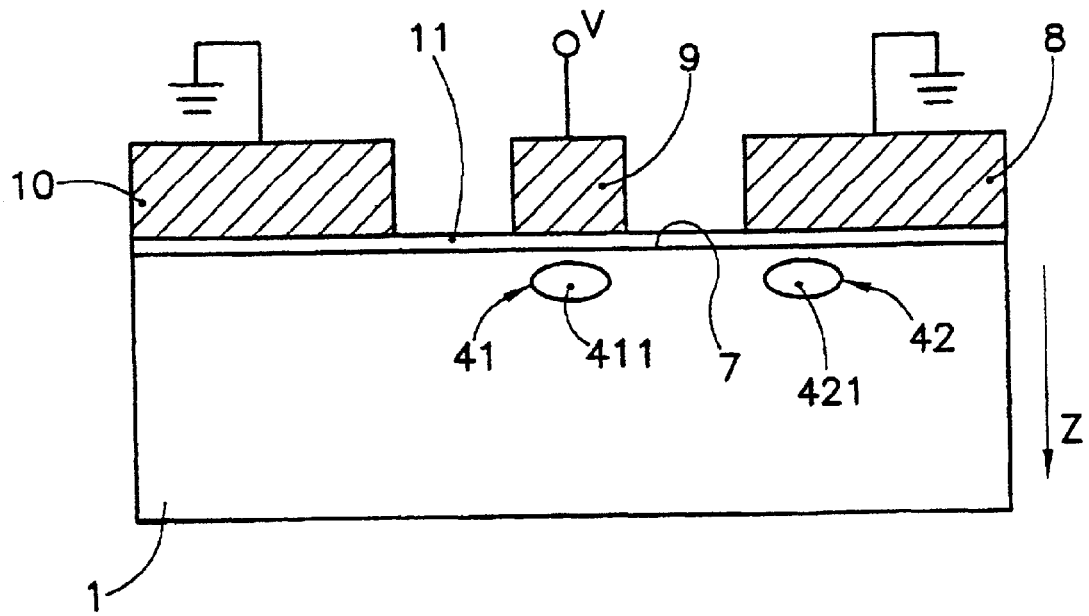
FIG. 2 is a cross-section of the modulator of FIG. 1 taken along line II—II.

Differently from the conventional CPW modulator of FIGS. 1 and 2, wherein the whole substrate 1 forms a single ferroelectric domain with a unique orientation, the modulator of FIGS. 5 and 6 allows a chirp-free operation, since in the modulation region 50 the structure thereof (as far as the optical waveguides and the electrodes are concerned) is symmetric. This is a significant advantage over the conventional modulator structure.

In the modulator of FIGS. 5 and 6 the optical waveguides 41 and 42 are both located under the ground electrodes 80 and 100. The overlap between the optical mode propagating through the waveguides and the modulation electric field is thus expressed by means of the overlap factor $\Gamma g$. The overlap between the optical mode propagating through a waveguide located under the ground electrode and the modulation electric field is lower than that achievable by locating the waveguide under the hot electrode: in this latter case, the overlap is expressed by an overlap factor $\Gamma h$ approximately six times higher than $\Gamma g$.

A lower overlap between the optical mode propagating through the waveguides and the modulation electric field means that a higher drive voltage is required to produce a similar electro-optic modulation of the waveguide refractive index. As a consequence, in the modulator of FIGS. 5 and 6 an increase of about a factor 3.5 in the drive voltage with respect to the single-domain CPW modulator of FIGS. 1 and 2 is required to achieve a similar refractive index modulation effect.

Figure 7:
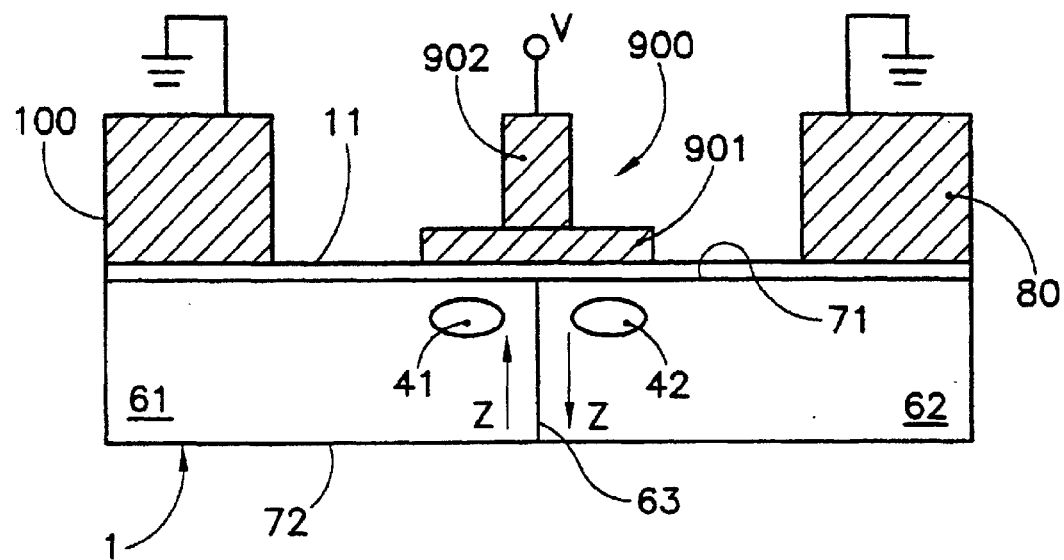
FIG. 7 shows, in cross-sectional view similar to that of FIG. 6, a chirp-free coplanar waveguide integrated electro-optic modulator according to another embodiment of the invention.

The coplanar waveguide modulator of FIG. 7 allows to reduce the drive voltage necessary to produce a given refractive index modulation with respect to the modulator of FIGS. 5 and 6, while preserving the chirp-free operation. Both the waveguides 41, 42 are located under a hot electrode 900 and the boundary 63 between the two ferroelectric domain regions 61, 62 is consequently positioned under the hot electrode 900. By means of this arrangement the overlap between the optical modes propagating through the waveguides and the modulation electric field is higher than that achievable by the structure of FIGS. 5 and 6, and even higher than that achievable in the conventional coplanar waveguide modulator of FIGS. 1 and 2. The drive voltage can thus be lower than that required by the modulator of FIGS. 5 and 6 and, at least in principle, even lower than that required by the conventional coplanar waveguide modulator of FIGS. 1 and 2. At the same time, the chirp-free operation is preserved, being the structure still symmetrical.

In the embodiment of FIG. 7, compared to that of FIGS. 5 and 6, the waveguides 41, 42 are closer to each other. However, the distance between the waveguides 41 and 42 has to be kept sufficiently large so as to avoid optical coupling between the two waveguides and thus to avoid any mutual exchange of wave energy between the waveguides. The hot electrode 900 under which both the waveguides are to be located has therefore to be sufficiently wide. A hot electrode width of at least 30 $\mu m$ is suitable to allow a waveguide separation large enough to avoid optical coupling and thus mutual exchange of wave energy between the waveguides 41 and 42.

A wide hot electrode has a low impedance. In order to keep the impedance high, the hot electrode 900 should be carefully designed so to have a particular shape, such as the so-called inverted "T" shape depicted in FIG. 7, with a plate 901 disposed above the buffer layer 11 at least 30 $\mu m$ wide, and a narrower stem 902 on the top of the plate 901. However, even with such a design, velocity matching electro-optic response in a band of 20 GHz can be achieved only when the input impedance of the modulator is approximately 25 $\Omega$. This is a too low impedance value for practical applications, thus the structure of FIG. 7 can be used with a band up to 10 GHz, so that a modulator input impedance higher than 30 $\Omega$ can be achieved. This frequency bandwidth limit has been calculated assuming a $V_\pi \cdot L$ product of 13 Vcm, where $V_\pi$ is the drive voltage and L is the length of the modulation region.

It is to be observed that in the modulator of FIG. 7 at least one ground electrode is necessary, even if the provision of two hot electrodes as shown in the drawing enhances the symmetry of the structure.

Figure 8:
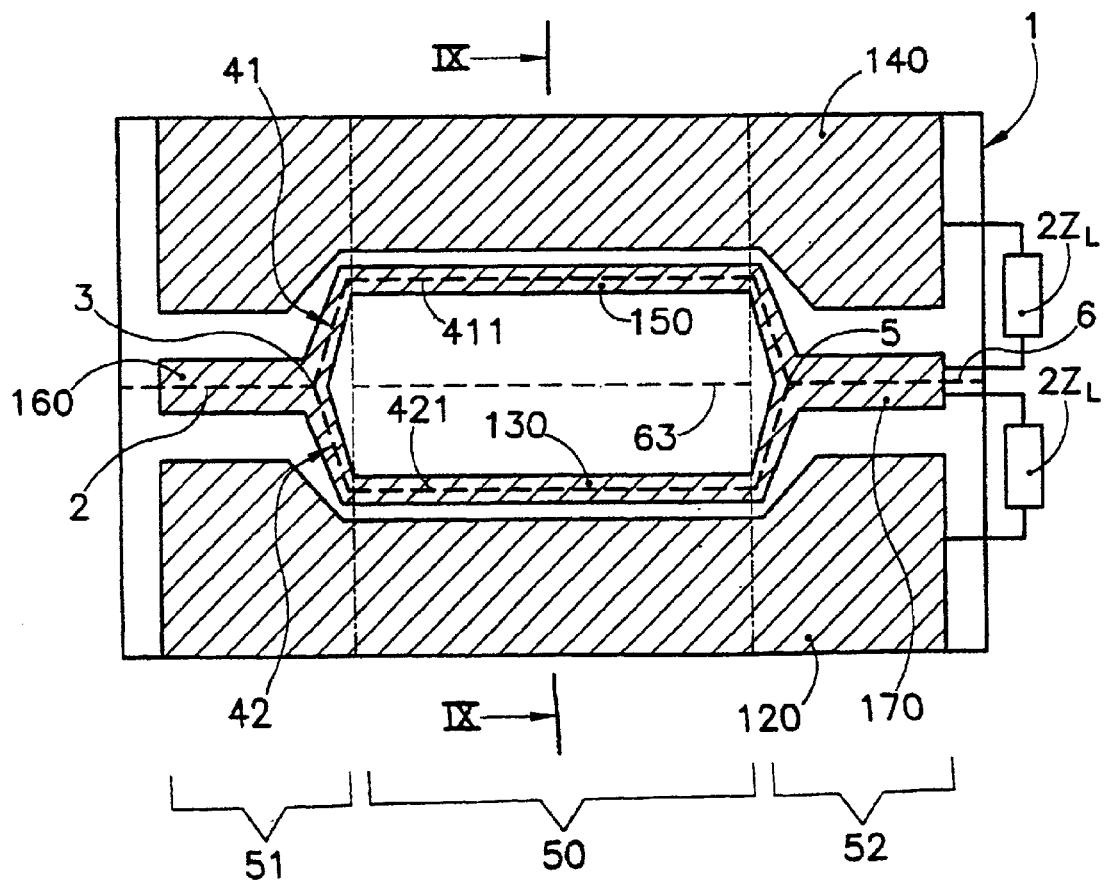
FIG. 8 is a schematic top-plan view of a double coplanar strip integrated electro-optic modulator according to still another embodiment of the invention, allowing a single-drive operability.
Figure 9:
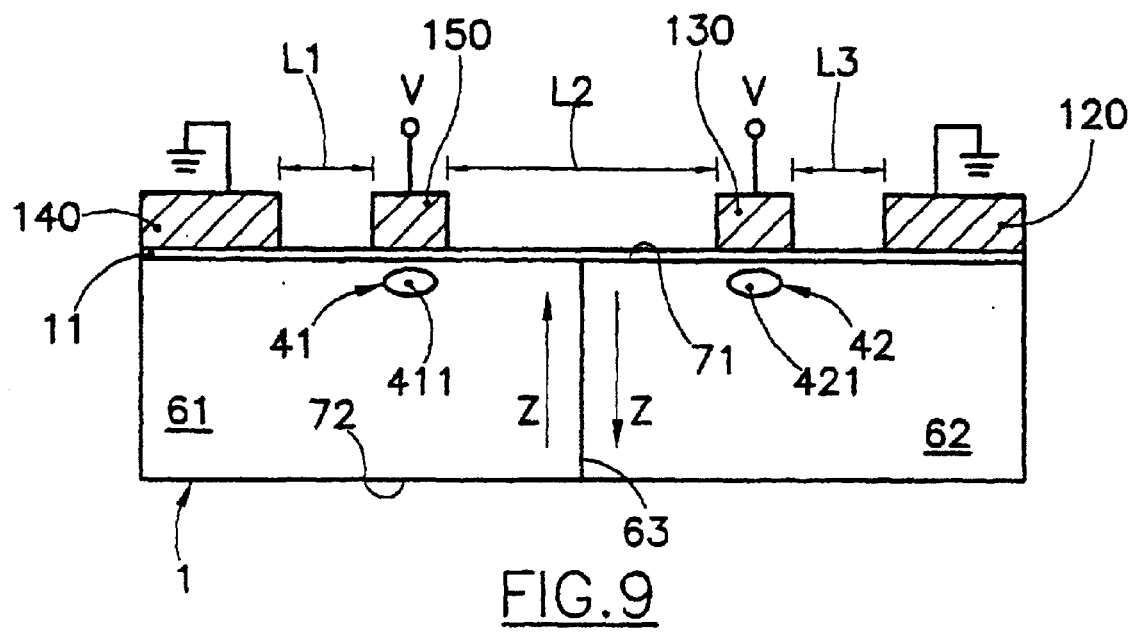
FIG. 9 is a cross-section of the modulator of FIG. 7 taken along line IX—IX.

FIGS. 8 and 9 show another embodiment of the invention, specifically a double coplanar strip (CPS) Mach-Zehnder integrated electro-optical modulator. As in the previous embodiments, the substrate 1 is of z-cut electro-optic material, for example an inorganic crystal such as LiNbO$_3$, LiTaO$_3$, KTP or non-centrosymmetric polymers which can be poled, poled glass, semiconductors, and includes, at least in a device modulation region 50, at least two regions 61, 62 having electro-optic coefficients of opposite sign, for example ferroelectric domain regions 61, 62 with mutually inverted ferroelectric domain orientations.

In each ferroelectric domain region 61, 62 a respective one of the two optical waveguides 41, 42 is formed, and the ferroelectric domain regions extend in the modulation region 50 longitudinally to the waveguides 41, 42. A boundary 63 between the two ferroelectric domain regions 61, 62 is positioned in an intermediate position between the two waveguides 41, 42, for example midway between the two waveguides 41, 42, so that the ferroelectric domain inversion comprises one of the two arms, in the modulation region 50, that is in the region where the optical mode interact with the modulating electric field.

The modulator comprises an arrangement of metal electrodes comprising two electrodes 130 and 150, intended to act as hot electrodes, which are superimposed over the waveguides 42 and 41, respectively, and extend for respective sections 421 and 411 thereof in the modulation region 50. The electrodes 130 and 150 additionally extend over the respective waveguides 42 and 41 also outside the modulation region 50, respectively in an upstream region 51 and a downstream region 52, and merge together in correspondence of the Y-junctions 3 and 4 to form electrode extensions 160, 170 superimposed over the input waveguide 2 and output waveguide 6, respectively. Electrodes 120 and 140, intended to act as ground electrodes, are substantially co-extensively arranged aside the electrodes 130 and 150, respectively, and the electrodes 160 and 170.

The fact that the waveguides 41, 42 are located under the hot electrodes 130, 150 increases the overlap between the optical modes propagating through the waveguides and the modulating electric field, and thus helps to reduce the driving voltage. Additionally, the structure is symmetric, so that a chirp-free operation is assured.

Figure 3:
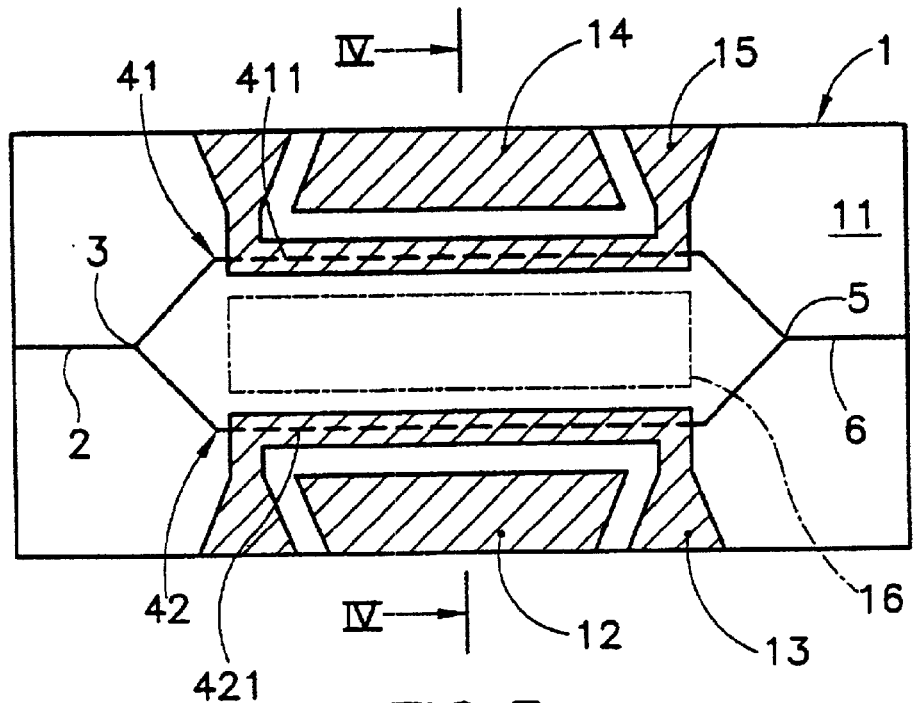
FIG. 3 is a schematic top-plan view of a conventional double coplanar strip integrated electro-optic modulator.
Figure 4:
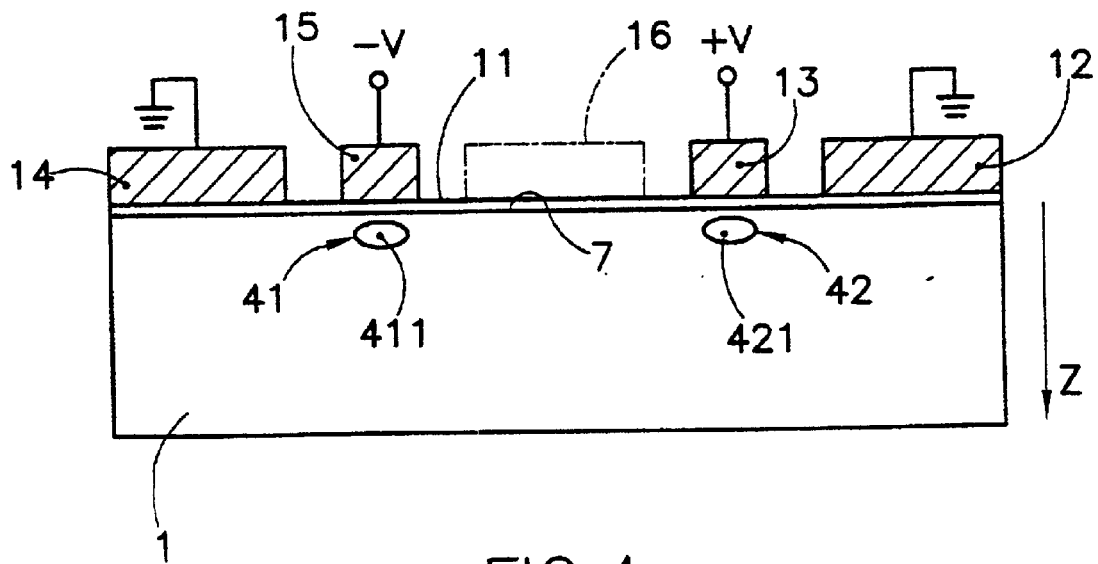
FIG. 4 is a cross-section of the modulator of FIG. 3 taken along line IV—IV.

Differently from the conventional double CPS modulator depicted in FIG. 3 which, in order to achieve a push-pull operation, needs a dual voltage drive (+V, −V), in the double CPS modulator of FIGS. 8 and 9 the formation of the two waveguides 41, 42 in the two mutually inverted ferroelectric domain regions 61, 62 has the advantage of allowing a single-drive operation. Mutually opposite refractive index modulation in the two waveguides 41, 42, and thus mutually opposite phase shifts of the optical modes propagating therethrough, can in fact be achieved by applying a same drive voltage V to the two hot electrodes 13 and 15, thanks to the fact that the ferroelectric domains in the two regions 61, 62 have mutually opposed orientations.

In the electrode arrangement of FIG. 8, in addition to a double CPS region in correspondence of the modulation region 50 of the device (where the optical modes propagating through the waveguides interact with the modulating electric field), two CPW regions exist, respectively input and output CPW regions, in the upstream 51 and downstream 52 regions, with adiabatic transitions between the input and output CPW regions and the double CPS region.

The input and output CPW electrodes can be designed in such a way that their impedances are equal to Zo/2, where Zo is the impedance of each CPS section of the double CPS structure. Although the input and output impedance of the modulator would be exactly Zo/2 if each of the strips 130, 150 were independently grounded at the output through an impedance Zo, in practice also in the structure of FIG. 8 the input and output impedance can be considered approximately equal to Zo/2. To prevent electrical reflection at the output, it is preferable to connect the CPW output section with a total load $Z_L$ approximately equal to Zo/2. In order to guarantee the symmetry of the structure for the modulating microwave, two microwave loads $2Z_L$, each of value $2Z_L$, are preferably connected between the extension 170 and the ground electrodes 120 and 140, respectively.

The electrode arrangement of FIG. 8 allows to form an integrated power splitter for the modulating microwave.

It is pointed out that although in FIG. 8 only the modulation section of the electrode arrangement is depicted, those skilled in the art will readily understand that additional electrode sections can be provided, for example the bias electrode section intended to insure that the device working point is properly selected. In this respect, it is worth noting that the biasing of the device can be achieved with a single electrode extending over both the waveguides, provided that the latter are formed in substrate regions having electro-optic coefficients of opposite sign.

Possible dimensions for the CPS region 50 are schematically indicated in FIG. 9. Reference numerals L1 and L3 are used to indicate the dimension of the gaps between the hot electrodes 130 and 150 and the contiguous ground electrodes 120 and 140, while reference numeral L2 designates the gap between the two hot electrodes 130 and 150. A suitable value for L1 is in the range 6 to 20 μm, for example 20 μm; for symmetry of the structure, substantially equal values apply to dimension L3. A suitable value for dimension L2 is equal to or more than 100 μm, to prevent any electrical coupling between the two adjacent coplanar strips 120, 130 and 140, 150. The buffer layer 11 is preferably made of benzo-cyclo-buthene (BCB) and has a thickness in the range 0.7 to 1.8 μm. The electrodes 120, 130, 140, 150 are preferably made of gold and have a thickness in the range 15 to 25 μm and the width of the hot electrodes 130 and 150 is in the range 5 to 14 μm.

The Applicant has observed that the structure proposed by the already cited JP 07-191352 in connection with an optical waveguide device in which a mutual exchange of wave energy between the waveguides takes place, with electrodes which are not coplanar but instead arranged in the upper and lower surfaces of the crystal substrate, is not suitable for realizing Mach-Zehnder modulators intended to operate at relatively high modulation frequencies. In electro-optical modulators both the drive voltage (also referred to as $V_\pi$) and the bandwidth (BW) are inversely proportional to the modulator length (the length L of the modulation region of the modulator). However, while on one hand it is desirable to have high modulator lengths, so to reduce the drive voltage, on the other hand the modulator length should be kept small so to achieve higher bandwidths. Stated in terms of the products $V_\pi \cdot L$ and $BW \cdot L$, a good electro-optical modulator should be characterized by a small $V_\pi \cdot L$ and a high $BW \cdot L$. Let it be assumed that the structure proposed in JP 07-191352 is adopted for realizing a Mach-Zehnder modulator, and that a modulator length L of approximately 3 cm is chosen so that the drive voltage is kept approximately equal to 5V. The Applicant has observed that in these conditions it is difficult to achieve bandwidths of approximately 5 GHz, due to the fact that the modulating microwave propagates substantially through the substrate and sees a refractive index substantially different from the refractive index seen by the optical mode. This is a consequence of the arrangement of the flat-plate positive and negative electrodes in the upper and lower surfaces of the crystal substrate.

By way of comparison, the Applicant has conducted simulations on the structure of FIG. 9 adopting the following values for the geometrical parameters:

hot electrode width: 7.5 µm;

L1=L3=20 µm;

L2=150 µm;

electrode thickness: 18 µm;

BCB layer thickness: 1.5 µm.

The drive voltage swing $V_\pi$ can be estimated to be approximately 4.2 V for an active CPS region 50 having approximately a length L of about 31 mm, giving a product $V_\pi \cdot L$ of approximately 13 V·cm.

As a result of the simulations, the Applicant has found that quasi-perfect phase-matching between the optical guided mode and the modulating microwave in each of the strips 130 and 150 is ensured, the refractive index seen by the modulating microwave being close to the refractive index seen by the optical mode (approximately equal to 2.14) for most of the frequency range of interest, from approximately 10 to approximately 40 GHz. The electro-optical response as a function of the modulation frequency shows a 3 dB bandwidth of the order of 40 GHz.

One reason for this is that in the structures of the present invention, having a coplanar electrode arrangement, the modulating microwave propagates also through the buffer layer 11, so that the average refractive index seen by the microwave is quite close to the refractive index seen by the optical mode.

The same structure also ensures that the impedance of each strip (Zo) remains above 60Ω. The resulting input modulator impedance is thus above 30Ω, which matches to the typical 50Ω source impedance without introducing too high input microwave reflection loss. The microwave loss is also kept low thanks to the use of the BCB buffer layer 11.

A lower $V_\pi \cdot L$ product can be achieved if the hot electrode width is increased to values comparable or greater than the optical mode dimension (typically the $1/e^2$ intensity width is 10 µm). However this has the drawback of producing a worse phase-matching.

The calculated electrical return loss for the proposed configuration results to be largely below the −10 dB level. Simulations show that the electro-optical response and electrical return loss have ripples. These ripples could be reduced by a better impedance matching of each of the CPS strips with the ground electrode. This could be achieved by grounding independently the two CPS strips with impedances Zo (i.e. equal to each CPS impedance). As mentioned above, this electrode configuration would also ensure that the input modulator impedance is Zo/2.

Figure 10:
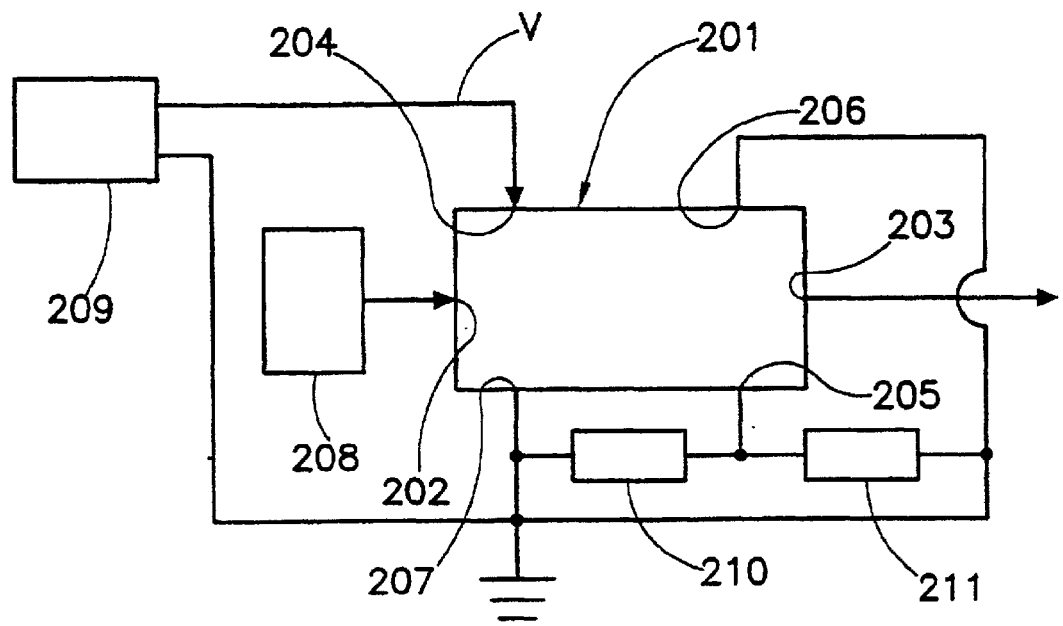
FIG. 10 is a simplified, schematic block diagram of a transmission station of an optical communication system including the coplanar waveguide modulator of FIG. 5 or 7 or the double coplanar strip modulator of FIG. 8.

FIG. 10 shows, in terms of a simplified schematic block diagram, a transmission station for an optical communication system including a modulator 201 according to any one of the embodiments shown in FIGS. 5 to 9. The modulator 201 has an optical input 202, receiving an optical beam for example generated by a laser source 208, and an optical output 203 for an intensity-modulated optical beam. The modulator 201 further comprises an electrical input 204, for receiving a modulating potential V from a driver 209, an electrical output 205, and two electrical ground terminals 206, 207 to be connected to a reference potential. For impedance matching, the electrical output 205 is coupled to the reference potential by means of suitable loads 210, 211. The modulator, both in the CPW configurations of FIGS. 5 and 7 and in the double CPS configuration of FIG. 8, allows a single drive operability.

Figure 11:
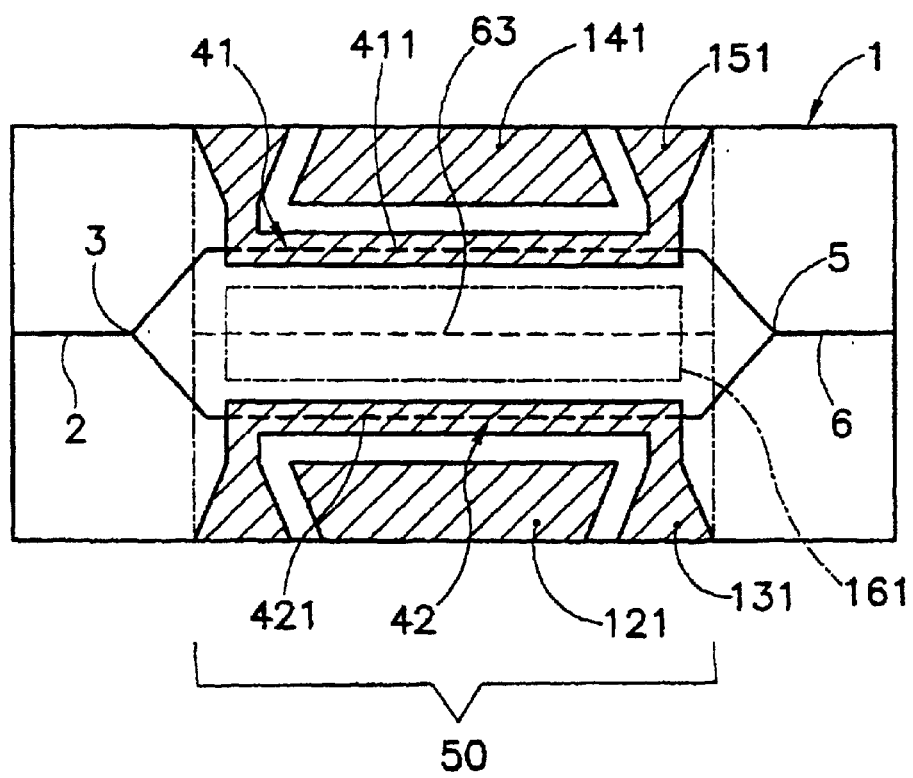
FIG. 11 shows, in schematic top-plan view, a double coplanar strip integrated modulator with an alternative electrode arrangement.

FIG. 11 shows, in top-plan view, a double coplanar strip modulator according to still another embodiment of the invention. Differently from the modulator of FIG. 8, the modulator comprises an arrangement of metal electrodes 12, 13, 14 and 15 structurally similar to that of the conventional double CPS modulator depicted in FIG. 3, with two ground electrodes 12, 14 and two hot electrodes 13, 15 superimposed over the waveguides 42 and 41, respectively, and extending for respective sections 421, 411 thereof.

Figure 12:
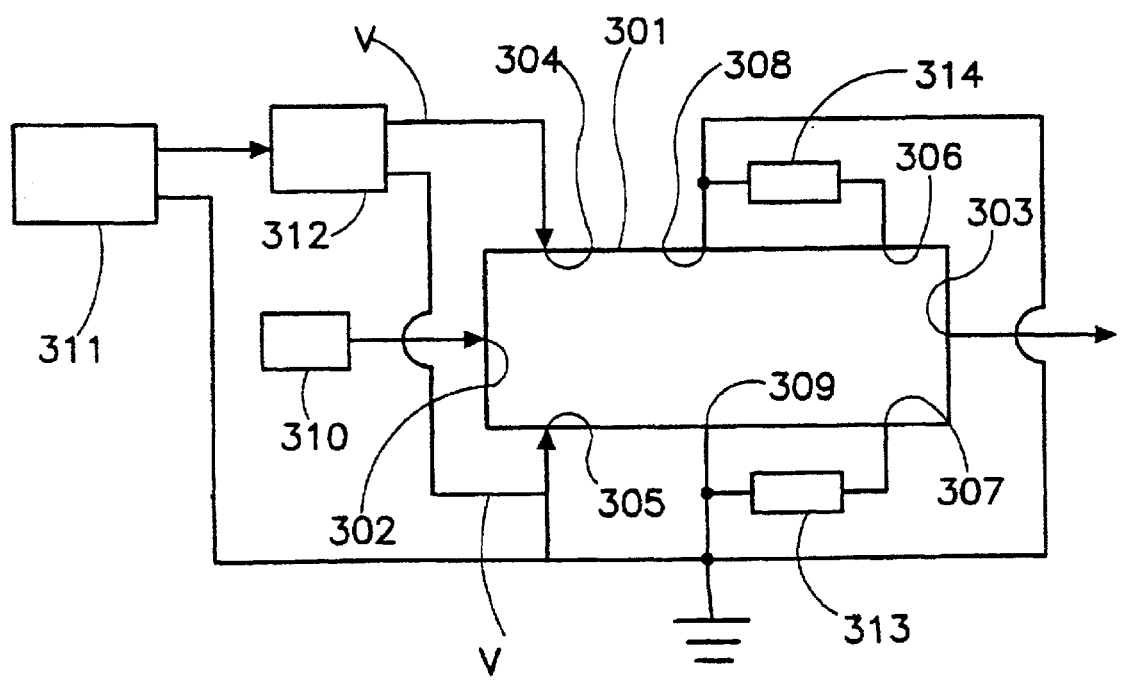
FIG. 12 is a simplified, schematic block diagram of a transmission station of an optical communication system including the double coplanar strip modulator of FIG. 11.

The double coplanar strip modulator of FIG. 11 still allows a single drive operability (the hot electrodes 13 and 15 are both supplied with a same polarity modulating potential), but differently from the embodiment of FIG. 8 it does not include an integrated power splitter for the modulating microwave. This is depicted in FIG. 12, which shows in terms of a simplified, schematic block diagram a possible use of the modulator (301 in the drawing) in a transmission station of an optical communication system. The modulator 301 has an optical input 302, receiving an optical beam for example generated by a laser source 310, and an optical output 303 for an intensity-modulated optical beam. The modulator 301 further comprises two electrical inputs 304 and 305, for receiving a same polarity modulating potential V from a driver 311 through a power splitter 312, two electrical outputs 306 and 307, and two electrical ground terminals 308, 309 to be connected to a reference potential. For impedance matching, the electrical outputs 306, 307 are coupled to the reference potential by means of suitable loads 313, 314.

It is to be observed that in the double CPS modulator of FIG. 11, a central ground electrode 16 could be provided (as in the prior art device of FIGS. 3 and 4), so as to make the structure more symmetric from the viewpoint of the modulating electric field distribution in the waveguides. In this case, the device becomes a double CPW modulator.

The coplanar integrated optical waveguide electro-optical modulator of the invention can be manufactured starting from a conventional z-cut slice of an electro-optic material, such as $LiNbO_3$. The integrated optical waveguides can be formed by means of any known technique, for example by selectively doping the substrate with titanium ions. Selective doping can be achieved using known photolithographic techniques and subsequent thermal diffusion processes.

Concerning the method of formation of the mutually opposed ferroelectric domain regions 61 and 62, various techniques of domain inversion have already been reported which allow to fabricate $LiNbO_3$ crystals including regions of different polarity, thus presenting reversal of those properties which are dependent on the direction and orientation of the z crystal axis.

Some methods for achieving ferroelectric domain inversion rely on the diffusion of ions at high temperature, close to the crystal Curie point.

As reported for example in N. Ohnishi, 'An etching study on a heat-induced layer at the positive-domain surface of $LiNbO_3$', Jap. J. Appl. Phys., vol.16, p.1069 (1977), $Li_2O$ outdiffusion at the z+ face of a $LiNbO_3$ crystal heated between 800–1100° C. for 1 to 20 hours can induce domain inversion.

In S. Miyazawa, 'Ferroelectric domain inversion in Ti-diffused $LiNbO_3$ optical waveguide', J. Appl. Phys., vol.50, p. 4599 (1979) it is reported that Ti-indiffusion, carried out at 950–1100° C. in air for 5 to 10 hours, can produce ferroelectric domain inversion on the z+ face.

K. Nakamura and H. Shimizu, 'Ferroelectric inversion layers formed by heat treatment of proton-exchanged LiTaO$_3$', Appl. Phys. Lett., vol. 56, p. 1535 (1990) reported that proton exchange followed by heat treatment close to the Curie temperature allowed ferroelectric domain inversion on the z+ face of LiNbO$_3$.

Cladding of SiO$_2$ followed by a heat treatment near the Curie temperature for several hours has also been used to stimulate Li$_2$O outdiffusion in LiNbO$_3$, as reported in M. Fujimura et al. 'Ferroelectric-domain inversion induced by SiO$_2$ cladding for LiNbO$_3$ waveguide SHG', Electronics Lett., vol. 27, p.1207 (1991), and ferroelectric domain inversion occurs on the z+ face under the coated area.

In L. Huang and N. A. F. Jaeger, 'Discussion of domain inversion in LiNbO$_3$', Appl. Phys. Lett., vol. 65, p. 1763 (1994) a simple model has been proposed in which ferroelectric domain inversion is associated to the space-charge field of a few hundred volts per centimetre resulting from NbLi defects and free electrons, which are produced by Li$_2$O outdiffusion at high temperature.

Another method to achieve ferroelectric domain inversion in LiNbO$_3$ and LiTaO$_3$, discussed for example in P. W. Haycock and P. D. Townsend, 'A method of poling LiNbO$_3$ and LiTaO$_3$ below Tc', Appl. Phys. Lett., vol. 48, p. 698 (1986), is based on the use of an electron beam. The first attempts were carried out at temperatures of about 600° C. (LiNbO$_3$) using small electric-fields of the order of 10 V/cm. The idea was that the oxygen ions combine in a molecular state smaller than the original single-ion state, making easier for the lithium ions to cross to the other side of the oxygen plane.

Any of the known ferroelectric domain inversion or poling techniques could in principle be used to form the ferroelectric domain regions 61, 62.

However, the regions of ferroelectric domain inversion obtained by diffusion of ions at high temperature are usually shallow (to a few microns depth below the surface), thus suitable only for waveguide applications. In addition they can suffer from the fact that the domain shape is triangular (Ti indiffusion, Li$_2$O outdiffusion, SiO$_2$ cladding) or semi-circular (proton exchange followed by heat treatment) giving sometimes a non-optimised overlap between the inverted region and the waveguide modes. The electron-beam irradiation technique can produce straight domains over the whole sample thickness (0.1–1 mm), giving the potential for improving the aforesaid overlap.

Other methods have been used to obtain ferroelectric domain inversion, including doping during Czochralski growth and laser heated pedestal crystal growth.

The most efficient poled devices to date have been obtained using the technique of electric field poling at room temperature, as discussed for example in M. Yamada et al., 'First-order quasi-phase-matched LiNbO$_3$ waveguide periodically poled by applying an external field for efficient blue second-harmonic generation', Appl. Phys. Lett., vol. 62, p. 435 (1993). High voltage pulses are applied to the z-cut substrate, so that the external electric fields are above the coercive field value (about 20 kV/mm for LiNbO$_3$), corresponding to which domain inversion occurs. The electric field poling technique allows to obtain straight domains over the whole thickness with a high degree of resolution (a few microns, as it has been shown by the periods fabricated for some quasi-phase-matched frequency conversion processes). In addition it is simpler and cheaper compared to the other methods.

In the context of the present invention, the regions having electro-optic coefficients of opposite sign, for example the ferroelectric domain regions in ferroelectric material substrates, have to be sufficiently large, transversally to the waveguides, so to include the waveguides of the two modulator arms. Preferably, the regions having electro-optic coefficients of opposite sign or the ferroelectric domain regions should extend to cover the whole transverse profile of the optical modes propagating through the waveguide.

The extension of the ferroelectric domain regions in the plane of the modulator (i.e. on the surface 71 of the substrate 1) can be defined with sub-micron resolution using lithographic techniques for the formation of the electrodes through which the poling voltage is applied.

As far as the thickness of inverted region is concerned, it is not essential that the ferroelectric domain regions 61, 62 extend to the bottom surface 72 of the substrate 1. However, the deeper the inverted region from the waveguide surface the greater the overlap with the optical mode. From this viewpoint, among all the possible poling techniques, electric field poling techniques are preferable.

The ferroelectric domain regions 61, 62 can be formed before or after the formation of the waveguides 2, 41, 42, 6 in the substrate 1.

Albeit in the detailed description so far provided the regions having electro-optical coefficients of opposite sign extended for the whole device modulation region, this is not to be intended as limitative to the invention. The ferroelectric domain regions could actually extend for only a portion of the modulation region.

Additionally, instead of only two regions having electro-optic coefficients of opposite sign, two successions of regions having alternated sign electro-optic coefficients could be provided, wherein each succession is passed through by a respective one of the two waveguides forming the modulator arms and pairs of regions in the two succession, contiguous in the direction transversal to the waveguides, have electro-optic coefficients of mutually opposite sign. In this way, phase velocity mismatches between the modulation electric field and the optical modulation of the optical modes propagating through the waveguides can be compensated.

Figure 13:
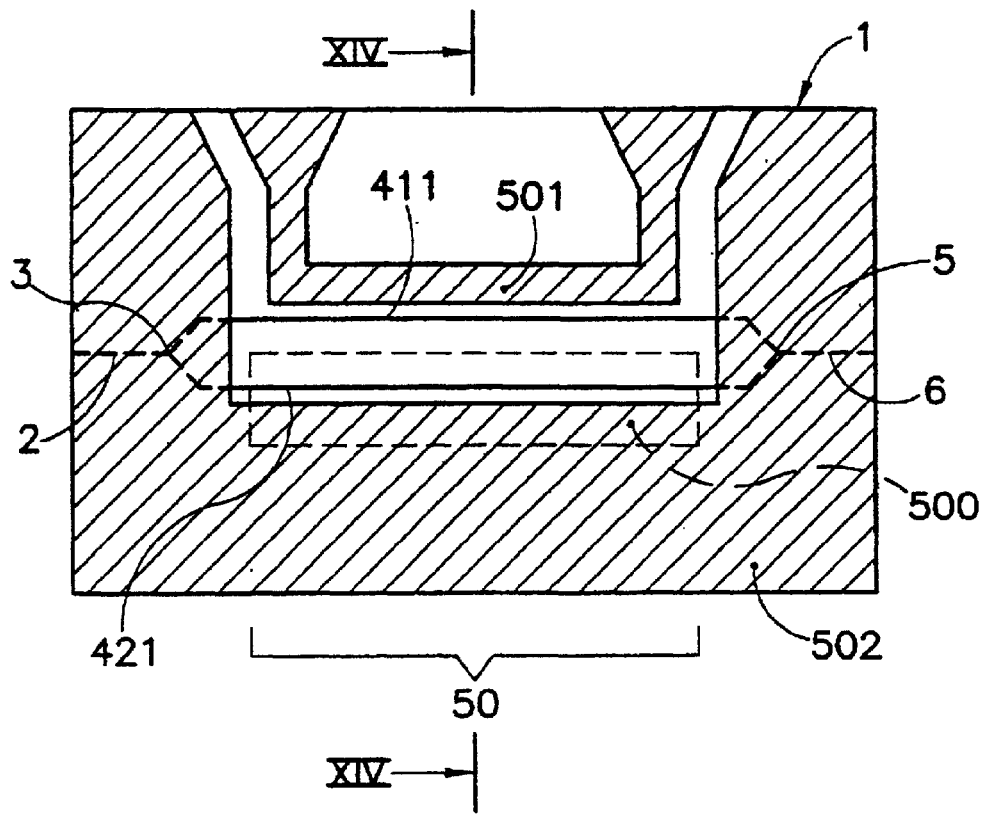
FIG. 13 is a schematic top-plan view of a coplanar modulator according to a further embodiment of the invention.
Figure 14:
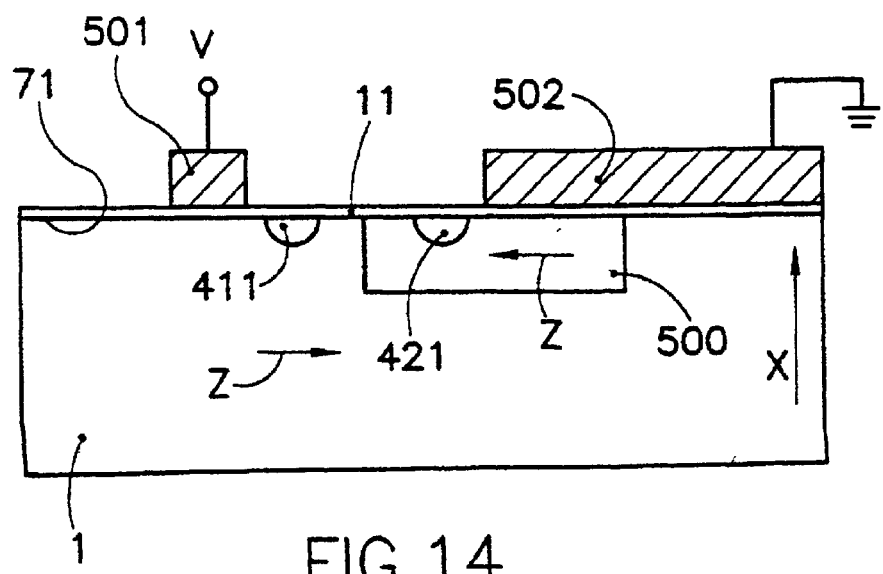
FIG. 14 is a cross-section of the modulator of FIG. 13 taken along line XIV—XIV.

It is important to note that the present invention not only applies to modulators formed in z-cut substrates, as those described up to now ion the present description. By way of example only, FIGS. 13 and 14 schematically show, respectively in top-plan and cross-sectional views, an embodiment of the invention in which a coplanar Mach-Zehnder modulator is formed in an x-cut substrate 1, that is, a substrate having the major surfaces perpendicular to the x crystal axis.

At least in a device modulation region 50, the two waveguides 411 and 421 constituting the interferometer arms are formed in substrate regions having electro-optic coefficients $r_{33}$ of opposite sign (as previously mentioned, $r_{33}$ is the electro-optic coefficient relating the refractive index change experienced by electromagnetic waves polarised along the z crystal axis to the component of the modulating electric field along the same axis). For example, assuming that the substrate is of a ferroelectric material such as lithium niobate, the waveguide 411 is formed directly in the substrate, supposed to have spontaneous polarization (and thus z crystal axis) oriented towards the right of the drawing, while the waveguide 421 is formed in a substrate region 500 in which the spontaneous polarization orientation has been reversed. A possible technique for inverting the orientation of spontaneous polarization in lithium niobate substrates is reported in Kishino et al., "70+ $\mu$m deep domain inversion in X-cut LiNbO$_3$ and its use in a high-speed bandpass integrated-optic modulator", Appl. Phys. Lett., Vol. 76, No. 26, pages 3852–3854.

An electrode arrangement is provided over the top major surface 71 of the substrate in correspondence of which the waveguides are integrated, with interposition of the buffer layer 11. The electrode arrangement includes a hot electrode 501 extending aside the waveguide 411 on the opposite side of the waveguide 421, and a ground electrode 502 extending aside the waveguide 421 on the opposite side of the waveguide 411.

The z component of the electric field generated in consequence to the application of a modulating potential V to the hot electrode 501 has a same direction and orientation in the two waveguides 411, 421. However, since the waveguides are formed in substrate regions having opposite-sign electro-optical coefficients, the refractive index of the two waveguides undergoes opposite changes, thus achieving a push-pull effect.

The coplanar integrated optical waveguide electro-optical modulator according to the present invention is particularly adapted to high data rate digital optical communications.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. Coplanar integrated optical waveguide electro-optical modulator, comprising:

a substrate (1) of an electro-optic material;

at least two optical waveguides (41, 42) integrated in the substrate in correspondence of a surface (71) thereof and defining a device modulation region (50) therebetween, such waveguides disposed with respect to each other so as to substantially prevent the exchange of optical energy between said waveguides within the device modulation region and an electrode system (80, 90, 100; 80, 90, 900; 12–15; 12–16; 120, 130, 140, 150, 160, 170; 501, 502) arranged on said surface for applying a modulating electric field to the waveguides suitable for causing a modulation of a refractive index of the two waveguides in the device modulation region, characterized in that the waveguides are formed, for at least a section thereof (411, 421) in the device modulation region, in respective substrate regions (61, 62; 1, 500) each of which includes at least two successive segments having electro-optic coefficients with alternated sign, each successive segment being passed through by a respective one of the at least two waveguides, pairs of regions in the successive segments, substantially aligned in the direction transversal to the waveguides, having electro-optic coefficients of mutually opposite sign, so that a modulating electric field of same direction and orientation in the waveguide sections causes refractive index modulations of opposite sign in the waveguide sections.

2. The coplanar integrated optical waveguide electro-optical modulator of claim 1, in which said waveguide sections and the respective substrate regions having electro-optic coefficients of opposite sign extend substantially for the whole device modulation region.

3. The coplanar integrated optical waveguide electro-optical modulator of claim 1, in which said electrode system comprises at least two ground electrodes (80, 100) each one extending over said section of a respective waveguide, and at least a hot electrode (90) extending between the ground electrodes, so as to form a coplanar waveguide electrode system.

4. The coplanar integrated optical waveguide electro-optical modulator of claim 1, in which said electrode system comprises one hot electrode (900) extending over said sections of the waveguides, and at least one ground electrode (80, 100) extending at the side of the hot electrode.

5. The coplanar integrated optical waveguide electro-optical modulator of claim 4, in which the waveguides are spaced apart of a distance suitable to substantially prevent optical coupling therebetween in the modulation region, the hot electrode comprising a wider portion (901) having a width equal to or higher than said distance, and a narrower portion (902) on the top of the wider portion.

6. The coplanar integrated optical waveguide electro-optical modulator of claim 1, in which said electrode system comprises two hot electrodes (13, 15; 130, 150), each one extending over said section of a respective waveguide, for receiving a same modulating voltage (V), and at least one ground electrode (12, 14; 120, 140) extending aside the hot electrodes, so as to form a double coplanar strip electrode system.

7. The coplanar integrated optical waveguide electro-optical modulator of claim 6, in which the at least one ground electrode comprises two ground electrodes, each one extending aside a respective hot electrode on an side thereof opposite to the other hot electrode.

8. The coplanar integrated optical waveguide electro-optical modulator of claim 7, in which said electrode system comprises an integrated power splitter (160, 130, 150) for receiving an externally-generated modulating voltage (V) and supplying it to the two hot electrodes.

9. The coplanar integrated optical waveguide electro-optical modulator of claim 8, in which outside said modulation region the waveguides are optically connected by means of respective Y-junctions (3, 5) to an input waveguide (2) and an output waveguide (6), the two hot electrodes merging together at said Y-junctions and having extensions (160, 170) over the input and output waveguides.

10. The coplanar integrated optical waveguide electro-optical modulator of claim 9, in which the ground electrodes extend aside said extensions so as to form, in correspondence of the input and output waveguides, coplanar waveguide electrode systems.

11. The coplanar integrated optical waveguide electro-optical modulator of claim 1, in which the substrate of electro-optic material is a z-cut substrate of ferroelectric material, particularly lithium niobate, the regions having electro-optic coefficients of opposite sign being regions having mutually oppositely oriented ferroelectric domains.

12. The coplanar integrated electro-optical modulator of claim 1, in which the substrate of electro-optic material is an x-cut substrate of ferroelectric material, particularly lithium niobate, the regions having electro-optic coefficients of opposite sign being regions having mutually oppositely oriented ferroelectric domains, said electrode system comprising a hot electrode and a ground electrode.

13. An electro-optical modulator comprising a coplanar integrated optical waveguide electro-optical modulator (201; 301) according to claim 1, and an electrical drive element (209; 311, 312) adapted for supplying to the electrode system a unipolar drive potential (V).

14. A transmission station for an optical communication system, comprising at least an optical beam generation means (208; 310) for generating an optical beam and an electro-optical modulator according to claim 13.

* * * * *